United States Patent [19]

Lord

[11] Patent Number: 4,523,435
[45] Date of Patent: Jun. 18, 1985

[54] METHOD AND APPARATUS FOR CONTROLLING A REFRIGERANT EXPANSION VALVE IN A REFRIGERATION SYSTEM

[75] Inventor: Richard G. Lord, Liverpool, N.Y.

[73] Assignee: Carrier Corporation, Syracuse, N.Y.

[21] Appl. No.: 562,896

[22] Filed: Dec. 19, 1983

[51] Int. Cl.³ .................. F25B 41/00; G05D 15/00
[52] U.S. Cl. ........................... 62/212; 62/225; 236/78 D; 364/163
[58] Field of Search .......... 62/212, 225; 236/78 D; 364/162, 163

[56]  References Cited
U.S. PATENT DOCUMENTS

| | | | |
|---|---|---|---|
| 3,577,743 | 5/1971 | Long | 62/212 |
| 4,407,013 | 9/1983 | Arcara | 364/162 X |
| 4,448,038 | 5/1984 | Barbier | 62/225 X |

OTHER PUBLICATIONS

Microcomputer Control in Industrial Processes, Skrokov, 1980, p. 82.
Process Instruments & Controls Handbook; Considine, 1958, pp. 11-25.

Primary Examiner—William E. Wayner
Attorney, Agent, or Firm—Frank N. Decker, Jr.

[57]  ABSTRACT

A refrigeration system is disclosed which may have multiple compression and condenser stages, in which an electronic refrigerant expansion valve is controlled by the digital output of a microcomputer which adjust the expansion valve in response to a valve change signal which is a function of a fraction of the deviation of the sensed refrigerant superheat from a desired superheat added to a multiple of the computed rate of change of the refrigerant superheat.

4 Claims, 2 Drawing Figures

METHOD AND APPARATUS FOR CONTROLLING A REFRIGERANT EXPANSION VALVE IN A REFRIGERATION SYSTEM

BACKGROUND OF THE INVENTION

This invention relates to refrigeration systems wherein the flow of refrigerant from the refrigerant condenser to the refrigerant evaporator is controlled by an adjustable refrigerant expansion valve which is responsive to the superheat of the refrigerant to be compressed.

Refrigeration systems are often provided with adjustable refrigerant expansion valves which are controlled in a manner to provide sufficient refrigerant to the evaporator to satisfy the refrigeration load but not enough to allow liquid refrigerant to enter the compressor cylinders, because this condition, known as "slugging" or "flooding", can result in serious damage to the compressor. Prior refrigeration systems have frequently controlled the flow of refrigerant through the expansion valve by sensing the refrigerant pressure or equivalent temperature in the evaporator and the temperature of superheated refrigerant leaving the evaporator. This difference in temperature is known in the art as "superheat".

Prior refrigeration systems have usually been designed to control the refrigerant expansion valve so as to provide a large safety margin of superheat to avoid flooding of the compressor. A large safety margin of superheat is usually necessary because of various operational variables such as changes in head pressure, suction pressure and refrigeration demand, and because of the sluggishness with which refrigeration systems respond to adjustments of the expansion valve and because of the difficulty of accurately measuring the superheat. Because of these variable factors, prior refrigerant control systems tend to provide either overcorrection or undercorrection of the refrigerant flow in the system which in turn can lead either to instability, reduced refrigeration capacity and low efficiency, or possible flooding of the refrigerant compressor.

For example, the refrigerant flow in a refrigeration system tends to be undercorrected during periods of time when the control system detects a high superheat condition but at the same time the superheat is rising rapidly. On the other hand, the flow of refrigerant in the system tends to be overcorrected when the control system detects a high superheat condition but at the same time the superheat is falling due to other system variables. These and other refrigeration system conditions giving rise to instability due to overcorrection or undercorrection, typically occur when condenser fan stages are switched on or off, compressor stages are added or removed, cooling medium flow is changed, or refrigeration load changes rapidly.

SUMMARY OF THE INVENTION

In accordance with the present invention the passage of refrigerant from the condenser to the evaporator is adjusted by a refrigerant expansion valve which is controlled in response to a function of both the superheat of the refrigerant and the rate of change in the superheat of the refrigerant. Adjusting refrigerant flow in response to both the magnitude of the superheat and the rate at which it is changing, tends to overcome the problems of instability due to overcorrection or undercorrection of refrigerant flow in prior refrigeration systems.

DESCRIPTION OF A PREFERRED EMBODIMENT

This invention will be described with reference to a refrigeration system, commonly called a water or brine chiller, which uses an air cooled condenser, a reciprocating compressor and an evaporator, such as a chiller vessel for directly expanding refrigerant in heat exchange with water or brine being chilled. However, it will be understood that the invention is equally applicable to heat pumps, or to machines whose primary purpose is to provide heating or which utilize liquid cooled condensers or other types of compressors. Also, while the invention will be described with respect to a direct expansion evaporator vessel for chilling water or brine on the exterior of the heat exchange tubes therein, the system may employ a flooded evaporator having the refrigerant on the outside of the tubes or an evaporator for directly cooling air or other fluids. Furthermore, a system of the type described may, in practice, desirably employ a plurality of chiller vessels, compressors, and condensers arranged in parallel or staged refrigerant circuits to provide the desired refrigeration and/or heating capacity. Also, while the invention will be described with reference to the preferred microprocessor based control system driving an electrically actuated stepper motor controlled expansion valve, it will be understood that mechanical, electrical, pneumatic or other controls may alternatively be used within the scope and spirit of the invention.

Figure 1:
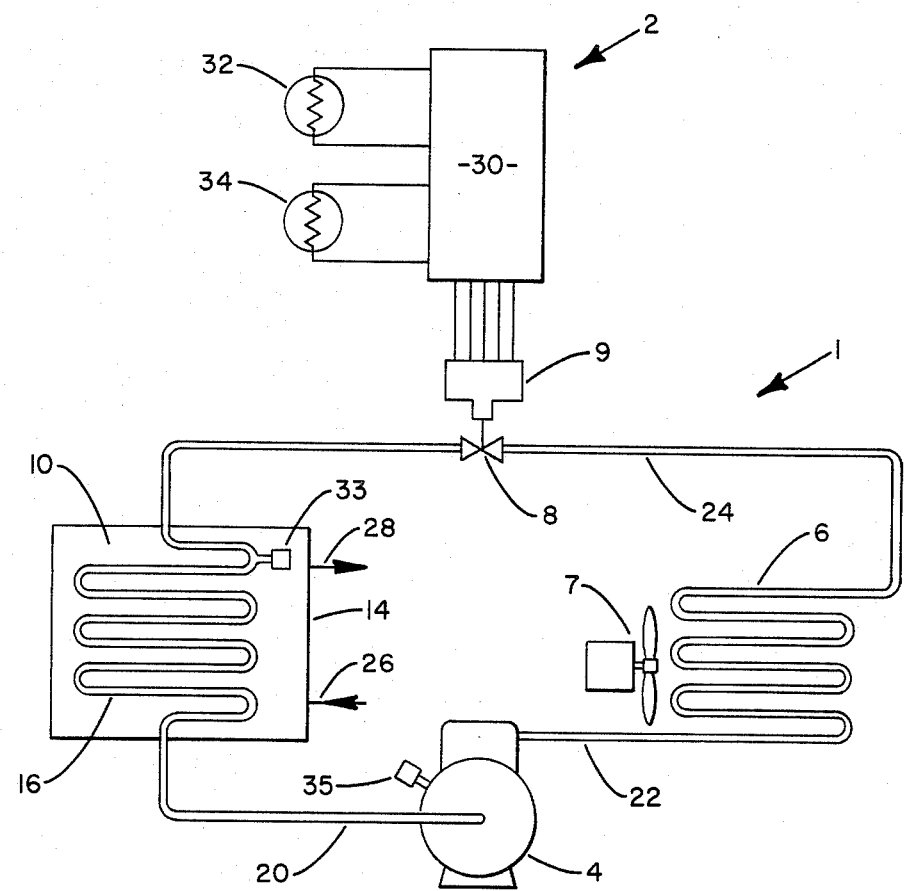
FIG. 1 is a schematic illustration of a refrigeration system and its associated control embodying the present invention.

Referring to FIG. 1, there is illustrated a refrigeration system 1 having a control 2. Refrigeration system 1 is illustrated as comprising a reciprocating compressor 4, an air cooled condenser 6 having a motor driven fan 7, refrigerant expansion valve 8 controlled by motor 9, and an evaporator 10. Evaporator 10 may typically comprise a tube in shell type cooler vessel, having a shell 14 which contains a plurality of heat exchange tubes 16 supported by tube sheets which form refrigerant inlet and outlet headers at the ends of the evaporator shell. The refrigeration system schematically illustrated herein, in actual practice, may desirably comprise a selectable plurality of compressors and/or compressor stages and a selectable plurality of condensers and/or condenser stages or fans, which may be switched in or out of operation as required by the operating conditions or requirements of the system.

In operation, refrigerant vapor is withdrawn from the refrigerant outlet of evaporator 10 through suction passage 20 by compressor 4. The refrigerant vapor is compressed in compressor 4 and passed through hot gas passage 22 into condenser 6 where the refrigerant is condensed to a liquid by heat exchange with a cooling medium, such as air being passed over heat exchange tubes of the condenser by one or more fans 7. The liquid refrigerant then passes through liquid passage 24, having expansion valve 8 therein, into the refrigerant inlet of evaporator 10. The expanded low pressure refrigerant passing through heat exchange tubes 16 evaporates therein and cools the water or other fluid admitted into the evaporator vessel through warm water inlet passage 26. The fluid which has been cooled in the evaporator vessel then passes to a desired location through chilled water outlet passage 28 to provide cooling at a desired location. Alternatively, the system may heat the fluid in vessel 14 or may cool or heat air or other medium by using other well known heat exchanger devices in place of vessel 14.

Control system 2 comprises, in its preferred form, a microcomputer 30 having suitable microprocessor, memory, input/output and power switching devices to electronically control a digitally controllable bipolar electric stepper motor 9, which in turn incrementally adjusts the opening and closing of expansion valve 8 to control the flow of refrigerant from condenser 6 to evaporator 10. Microcomputer 30 acquires analog or other types of input signals from temperature responsive resistance elements such as thermistors 32 and 34, or other types of sensors, and processes those input signals to generate an electronic digital valve control output signal which actuates stepper motor 9. A suitable microcomputer controlled expansion valve and associated stepper motor are more fully described in a co-pending application Ser. No. 06/564,543 filed Dec. 22, 1983.

Thermistor 32 is a part of an evaporator probe assembly 33 which may be located in a refrigerant inlet header of evaporator 10, or some other suitable location for sensing a temperature or pressure corresponding with the saturated refrigerant temperature in the evaporator. Thermistor 34 is a part of a probe assembly 35 which senses a refrigerant temperature at a suitable location, preferably within the shell of compressor 4, corresponding with the temperature of superheated refrigerant passing from evaporator 10 to the compression section of compressor 4. The difference between the temperature sensed by sensor 34 and that sensed by sensor 32 represents the superheat of the refrigerant vapor.

In accordance with this invention, microcomputer 30 processes the signals provided by sensors 32 and 34 and adjusts refrigerant expansion valve 8 in accordance with a function of the sensed superheat temperature of the refrigerant and a function of the rate of change of the superheat temperature.

Figure 2:
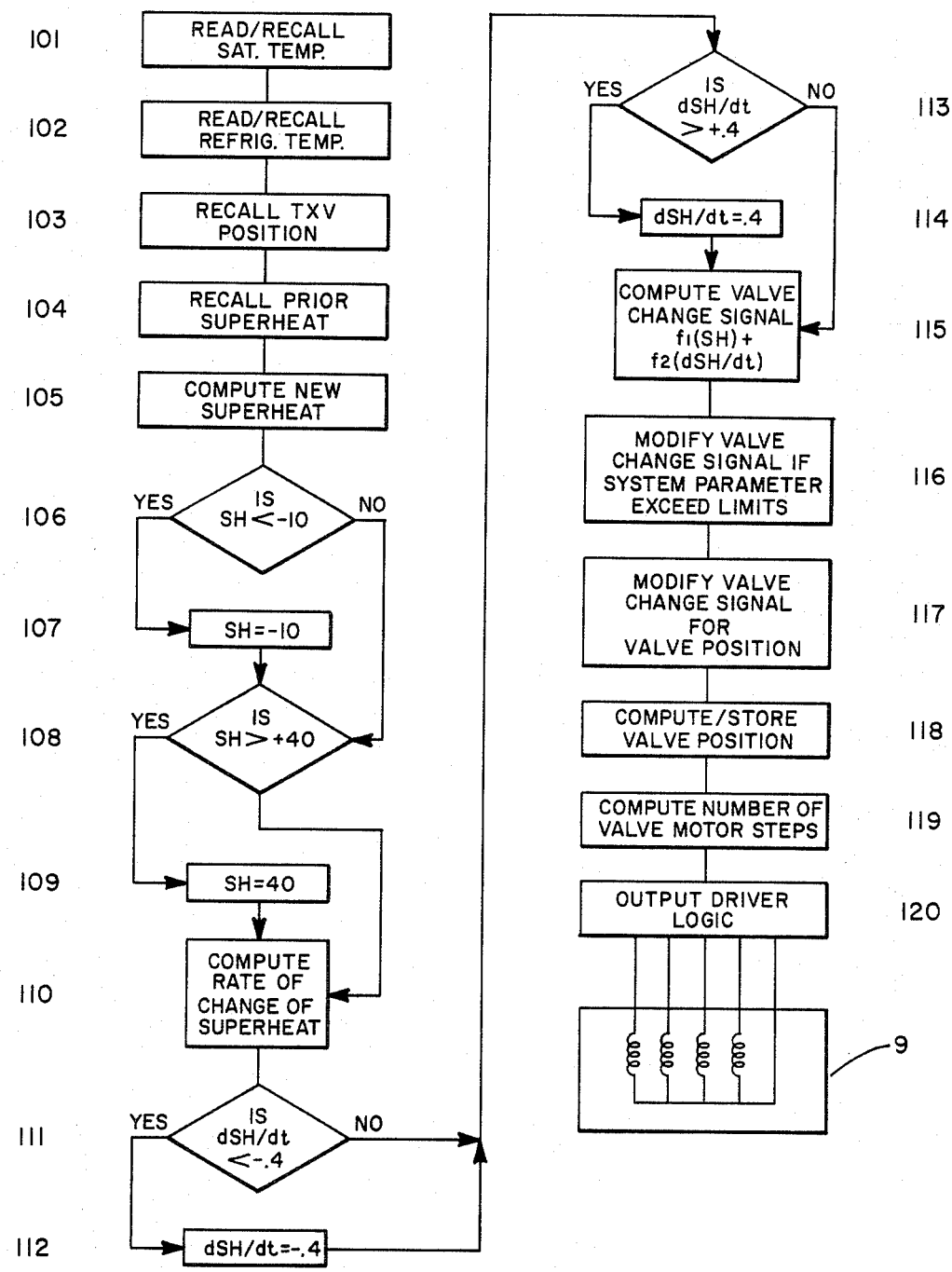
FIG. 2 illustrates a flow chart of suitable logic for practicing the present invention by means of a microprocessor based control.

FIG. 2 illustrates a flow diagram of a basic logic program for accomplishing the signal processing which may be incorporated into a preferred electronic control employing a microcomputer. It will be understood that while an electronic control of the type described is preferred, other types of temperature sensors and controls may be employed if desired.

In step 101 the present saturation temperature of refrigerant in the evaporator sensed by sensor 32 is read, stored and recalled. In step 102 the present temperature of superheated refrigerant sensed by sensor 34 is read, stored and recalled. In step 103 the present position of the refrigerant expansion valve is recalled from memory and in step 104 the last computed superheat temperature is recalled from memory.

In step 105 the present superheat is computed by subtracting the saturation temperature read in step 101 from the superheated refrigerant temperature read in step 102 and a present superheat signal is generated. In step 106 the present superheat signal is compared with a predetermined low superheat temperature, such as −10° F., and if it is less than that temperature the signal is clamped in step 107 to that low value. However, if in step 106, the present superheat signal is greater than the predetermined low temperature limit, the logic proceeds to step 108. In step 108 the present superheat signal is compared with a predetermined high superheat temperature, such as +40° F., and if it is higher than that temperature limit, the signal is clamped at that predetermined high value, but if it is lower than the predetermined value the logic proceeds to step 110. The limit temperatures to which the superheat temperature is compared are imperically selsected based on observation of the actual system response characteristics. Steps 106 to 109 provide a clamping function to limit the sensitivity of the control to high and low superheat conditions.

In step 110 the rate of change of superheat is computed by comparing the present superheat signal from step 109 or 108 with the prior superheat signal recalled from step 104. In step 111 the rate of change of superheat is compared with a low negative limit value such as 0.4° F./sec, and if it is less than −2 the rate of change signal is clamped at −0.4 if not the signal proceeds to step 113 where the rate of change of superheat is compared with some high positive limit value such as 0.4° F./sec, and if greater, it is clamped at +0.4. Steps 111 to 114 provide a clamping function to limit the sensitivity of the control to rapid changes in superheat. The limit values to which the rate of change signal is compared are also imperically selected based on observed characteristics of the system.

The logic then proceeds to step 115 where a valve change signal is computed. The valve change signal algorithm computed in step 115 is the sum of a first function of the present superheat condition computed at step 105 as modified in steps 106 to 109, added to a second function of the rate of change in superheat computed at step 110 as modified at step 111 to 114. The actual algorithm computed at step 115 is an imperical function based on observed system characteristics such as the rate of change of superheat for changes in the particular physical characteristics of the system and the desired safety margin of superheat. Typically, this algorithm may comprise a fraction, less than 1, of the deviation of the computed present superheat from a predetermined desired superheat, plus a multiple, greater than 1, of the computed rate of change in superheat. For a particular refrigeration system employing an electronic expansion valve as described in connection with the preferred embodiment hereof, and more fully set forth in the aforementioned application, the following algorithm has been found to yield an appropriate valve change signal: ½ (SH-15)+8(dSH/dt). In this system it is assumed that the superheat safety factor to be maintained should be about 15° F. and the term ½ (SH-15) represents a fraction (½) of the deviation of the sensed present superheat (SH) from the desired superheat (+15° F.), as modified by the clamping circuitry to prevent overcorrection for the deviation from desired superheat. The term 8 (dSH/dt) represents a multiple (8) of the computed rate of change of superheat (dSH/dt), as modified by the clamping circuitry to prevent over correction for the rate of change function. The derivation of the particular algorithm, however, is basically a matter of trial and error based on the observed characteristics of the particular refrigeration and control system, although the general nature of the function is applicable to a wide variety of differing refrigeration systems.

The valve change signal computed at step 115 may then be modified in step 116, if desired, for various other system parameters. For example, if system temperatures, pressures, motor currents and the like exceed predetermined permissible limits, then the valve change signal may be modified to take corrective action or to shut down or modify the operation of the system, as required. In step 117 the valve change signal may be further modified to compensate for valve nonlinearity, if desired. At step 118 a new valve position is computed and stored in memory for subsequent use at step 103. At step 119 the proper number of valve motor steps is computed and an appropriate digital signal is provided to the output driver logic at step 120 in order to provide an electronic valve control signal to pulse the windings of stepper motor 9 the required number of steps to adjust the valve position to the desired position computed at step 118.

It has been found that the deviation of the refrigerant superheat from the desired superheat, alone, is not an altogether reliable indication of the optimum change in valve position to restore the desired superheat. However, the present invention provides a valve controlsignal which essentially comprises a function of the deviation in the present superheat from a desired superheat, and a function of the rate of change of superheat in the system. By taking into consideration both of these factors, it is possible to obtain superior control over the refrigerant flow from the condenser to the evaporator and to greatly reduce the tendency of the refrigeration system to become unstable or to flood the compressor.

For example, in a liquid chiller employing multiple compressors and condenser fan stages, if a compressor stage is added to the system, the suction pressure and saturation temperature tend to decrease rapidly, thereby rapidly increasing the superheat of the refrigerant passing to the compressor. Similarly, if the system experiences a sudden drop in head pressure, as for example, when a condenser fan stage is turned on, or there is a sudden increase in refrigeration load, there is a tendency for the superheat likewise to increase rapidly. Under these conditions a control system which is merely responsive to the present deviation from the desired superheat, fails to take into consideration that the superheat is rising at an increasing rate, and therefore the expansion valve needs to be opened more than the deviation from the desired superheat would indicate. The present invention overcomes this problem by adding a positive rate of change function to the valve control signal which causes the valve to open by an increased amount and thereby increases its responsivness to the need for more refrigerant flow than indicated by the superheat signal alone.

On the other hand if the system experiences a sudden rise in suction or condenser pressure, as may happen when a compressor stage or a condenser fan is turned off, or if the load on the system suddenly drops, the superheat tends to decrease at a rapid rate and the system may be in danger of flooding the compressor by feeding excess refrigerant to the evaporator. Under these circumstances the control system of this invention adds a negative rate of change function to the valve control signal which causes the refrigerant expansion valve to close by an increased amount, thereby speeding up the reduction in the flow of refrigerant to the evaporator and inhibiting flooding of the compressor.

There are also conditions of operation of a refrigeration system where there is either a positive or negative deviation in the superheat from the design superheat but little or no change in valve position is required. This condition occurs when the rate of change in superheat is opposite that of the deviation from design superheat, due to changes in the operation of the refrigeration system. Such a condition may occur if a compressor has been added to the system at the same time that a condenser fan is turned off. Under such circumstances the added compressor capacity will cause a rapid increase in sensed superheat at a time when the increasing head pressure will cause a negative rate of change to occur. The system is therefore in danger of becoming instable due to overcorrection of the valve. Under such circumstances the control of this invention will provide a rate of change signal which will decrease the valve opening signal or increase the valve closing signal, to prevent the system from overshooting and becoming unstable.

In general, the control system and method of this invention tends to make the refrigerant expansion valve respond more rapidly when there is a higher superheat than the design superheat and a positive rate of change is detected, or when there is a lower superheat than the design superheat and a negative rate of change is detected. On the other hand, the control of this invention tends to reduce the rate of response of the refrigerant expansion valve when the superheat exceeds the design value but the rate of change in superheat has a negative value or when the superheat is lower than the design value but there is a positive rate of change in the superheat. Consequently, the control system tends to speed up the response of the expansion valve when the rate of change of superheat is moving in the same direction as the deviation from the design superheat and tends to slow down the response of the expansion valve when the rate of change of the superheat is moving in the opposite direction from the deviation from the design superheat. The result is that undershooting and overshooting of the actual superheat is avoided at times when the superheat and deviation from design are moving in the same direction, and instability or hunting of the system is avoided when the rate of change of superheat is moving in the opposite direction from that of the deviation from design superheat.

The control system and method described herein makes it possible to safely operate a refrigeration system with a lower safety margin of superheat. That, in turn, enables the system to have less evaporator heat transfer surface and/or greater refrigeration capacity with increased efficiency.

It will be appreciated that while a preferred embodiment of this invention has been described for purposes of illustration, the invention may be otherwise embodied within the scope of the following claims.

What is claimed is:

1. A refrigeration system comprising:
   (A) a condenser for condensing refrigerant vapor;
   (B) an evaporator for evaporating liquid refrigerant to provide cooling;
   (C) compression means for compressing refrigerant vapor formed in the evaporator and for passing the compressed refrigerant vapor to the condenser;
   (D) an adjustable refrigerant expansion valve for controlling the passage of refrigerant from the condenser to the evaporator;
   (E) superheat temperature signal generating means for generating a superheat temperature signal which is a function of the superheat of refrigerant passing from the evaporator to the compression means;

(F) superheat rate signal generating means for generating a superheat rate signal which is a function of the rate of change of the superheat of refrigerant passing from the evaporator to the compression means;

(G) valve control signal generating means for generating a valve control signal which comprises a function of a fraction of the difference between the superheat temperature signal and a predetermined superheat temperature signal, added to a function of a multiple of the superheat rate signal;

(H) valve control means comprising an electric motor connected to the refrigerant expansion valve for adjusting the refrigerant expansion valve in response to the valve control signal provided by said microcomputer; and (I) signal processing means for clamping the superheat temperature signal supplied to said valve control signal generating means between predetermined high and low temperature limits, thereby decreasing the sensitivity of the refrigerant expansion valve to large deviations in the superheat temperature signal from a predetermined superheat temperature.

2. A refrigeration system comprising:

(A) a condenser for condensing refrigerant vapor;

(B) an evaporator for evaporating liquid refrigerant to provide cooling;

(C) compression means for compressing refrigerant vapor formed in the evaporator and for passing the compressed refrigerant vapor to the condenser;

(D) an adjustable refrigerant expansion valve for controlling the passage of refrigerant from the condenser to the evaporator;

(E) superheat temperature signal generating means for generating a superheat temperature signal which is a function of the superheat of refrigerant passing from the evaporator to the compression means;

(F) superheat rate signal generating means for generating a superheat rate signal which is a function of the rate of change of the superheat of refrigerant passing from the evaporator to the compression means;

(G) valve control signal generating means for generating a valve control signal which comprises a function of a fraction of the difference between the superheat temperature signal and a predetermined superheat temperature signal, added to a function of a multiple of the superheat rate signal;

(H) valve control means comprising an electric motor connected to the refrigerant expansion valve for adjusting the refrigerant expansion valve in response to the valve control signal provided by said microcomputer; and (I) signal processing means for clamping the superheat rate signal supplied to said valve control signal generating means between predetermined high and low limits, thereby decreasing the sensitivity of the refrigerant expansion valve to large changes in the superheat rate signal.

3. A method of controlling the flow of refrigerant in a refrigeration system having a condenser, ad adjustable refrigerant expansion valve, an evaporator and a compression means, which comprises the steps of:

(A) passing refrigerant vapor from the evaporator to the compression means;

(B) generating a superheat temperature signal which is a function of the superheat of refrigerant passing from the evaporator to the compression means;

(C) generating a superheat rate signal which is a function of the rate of change of superheat of refrigerant passing from the evaporator to the compression means;

(D) generating a valve control signal which comprises a function of a fraction of the difference between the superheat temperature signal and a predetermined superheat temperature signal, added to a function of a multiple of the superheat rate signal;

(E) controlling the passage of refrigerant from the condenser to the evaporator by adjusting the refrigerant expansion valve in response to said valve control signal; and (F) generating a limited superheat temperature signal by clamping the superheat temperature signal between predetermined high and low temperature limits; and wherein the step of generating the electronic valve control signal comprises generating a valve control signal which comprises a function of the limited superheat temperature signal and the predetermined superheat temperature signal.

4. A method of controlling the flow of refrigerant in a refrigeration system having a condenser, ad adjustable refrigerant expansion valve, an evaporator and a compression means, which comprises the steps of:

(A) passing refrigerant vapor from the evaporator to the compression means;

(B) generating a superheat temperature signal which is a function of the superheat of refrigerant passing from the evaporator to the compression means;

(C) generating a superheat rate signal which is a function of the rate of change of superheat of refrigerant passing from the evaporator to the compression means;

(D) generating a valve control signal which comprises a function of a fraction of the difference between the superheat temperature signal and a predetermined superheat temperature signal, added to a function of a multiple of the superheat rate signal;

(E) controlling the passage of refrigerant from the condenser to the evaporator by adjusting the refrigerant expansion valve in response to said valve control signal; and (F) generating a limited superheat rate signal by clamping the superheat rate signal between predetermined limits; and wherein the step of generating the electronic valve control signal comprises generating a valve control signal which comprises a function of the limited superheat rate signal.

* * * * *